United States Patent [19]

Matsumura et al.

[11] 4,419,308

[45] Dec. 6, 1983

[54] PROCESS FOR PRODUCING POROUS, FILM-LIKE OR FIBROUS STRUCTURE OF AROMATIC POLYESTER

[75] Inventors: Shunichi Matsumura; Hiroo Inata, both of Iwakuni, Japan

[73] Assignee: Teijin Limited, Osaka, Japan

[21] Appl. No.: 479,724

[22] Filed: Mar. 28, 1983

[30] Foreign Application Priority Data

April 13, 1980 [JP] Japan .................................. 55-60294

[51] Int. Cl.$^3$ .............................................. B29D 27/04
[52] U.S. Cl. .................................... 264/49; 264/209.1; 264/344; 264/561; 521/64; 521/182
[58] Field of Search ...................... 264/49, 209.1, 344, 264/561; 521/64

[56] References Cited

U.S. PATENT DOCUMENTS 3,957,651  5/1976  Kesting .................................. 521/64

*Primary Examiner*—Morton Foelak
*Attorney, Agent, or Firm*—Sherman & Shalloway

[57] ABSTRACT

A process for producing a porous, film-like or fibrous structure of an aromatic polyester, which comprises (1) forming a substantially non-oriented film-like or fibrous structure by melt-molding an aromatic polyester blend composed of (A) an aromatic polyester containing an aromatic dicarboxylic acid as a main acid component and an aliphatic diol and/or an alicyclic diol as a main glycol component, and (B) at least one low-molecular-weight compound selected from the group consisting of imide compounds and isocyanurate compounds being compatible, but substantially non-reactive, with the aromatic polyester and having a molecular weight of not more than 1,000, the amount of the low-molecular-weight compound being present in an amount of 10 to 300 parts by weight per 100 parts by weight of the aromatic polyester, and (2) extracting at least a major part of the low-molecular-weight compound from the resulting substantially non-oriented film-like or fibrous structure with an organic solvent which can dissolve the low-molecular-weight compound but under the extracting conditions does not substantially dissolve the aromatic polyester.

23 Claims, No Drawings

PROCESS FOR PRODUCING POROUS, FILM-LIKE OR FIBROUS STRUCTURE OF AROMATIC POLYESTER

This invention relates to a process for the production of a porous, film-like or fibrous structure of an aromatic polyester. More specifically, this invention relates to a process for producing a porous, film-like or fibrous structure, which comprises melt-molding an aromatic polyester blend composed of an aromatic polyester and a low-molecular-weight imide or isocyanurate compound, and extracting the resulting substantially non-oriented film-like or fibrous structure with an organic solvent.

Polyesters, particularly polyethylene terephthalate and polytetramethylene terephthalate, find extensive use as fibers, films and plastics because of their excellent mechanical properties, electric insulation and chemical stability.

In recent years, investigations have been made to impart a new property to shaped articles of polyesters while retaining the inherent excellant properties of the polyesters, and one such investigation is directed to making the polyester shaped articles porous. Known methods for making the polyester articles porous include, for example, a method which comprises dissolving an aromatic polyester and a second polymer soluble in a hydrophilic liquid which is a non-solvent for the polyester, such as polyvinyl alcohol or polyvinyl pyrrolidone, in an organic solvent capable of dissolving these two materials, casting the resulting solution into a film, drying it, and treating the dried film with a solvent capable of dissolving the second polymer (see Japanese Patent Publication No. 34790/1979 and U.S. Pat. No. 3,957,651); and a method which comprises dissolving a polymer selected from various polymers including aromatic polyesters in an organic solvent to prepare a homogeneous solution, molding the solution into such a form as a film, cooling the solution in the molded state to generate a nucleus composed of pure solvent, and thereafter extracting the nucleus of the solvent with another suitable solvent thereby to produce a microporous cellular polymeric structure (see Japanese Laid-Open Patent Publication No. 29367/1978 and U.S. Pat. No. 4,247,498). These two methods are common in that they include a step of preparing a polymer solution by dissolving a polymer in an organic solvent.

There are also known a method for producing porous hollow yarns of polyesters, which comprises drawing an unstretched hollow yarn of a polyester in which at least 60 mole % of the recurring units are composed of butylene terephthalate units at a temperature of not more than 140° C. at a draw ratio of 30 to 550%, preferably at least 80% of the maximum draw ratio, whereby large shear is generated between the crystals of the polyester (see Japanese Laid-Open Patent Publication No. 101,918/1979), and a method for producing microporous hollow fibers, which comprises producing nonporous hollow precursor fibers from a polymer selected from various polymers including polyesters, allowing the fibers to absorb a swelling agent having a moderate solubility parameter, then stretching the fibers at an elongation of about 150 to about 400% and at a strain speed of about 5 to about 150% min., and thereafter removing the swelling agent (see Japanese Laid-Open Patent Publication No. 15,412/1981 and U.S. Pat. No. 4,290,987). These methods are common in that large shear is generated between the crystals during stretching or elongation to form micropores.

A method is also known which comprises producing undrawn hollow yarns from a blend of a poly($C_2$–$C_6$)alkylene terephthalate and an alkyl- or aryl-sulfonic acid salt, stretching the yarns, treating them with an alkaline compound to remove at least a part of the sulfonate salt and to form microporous hollow polyester fibers in which the micropores are arranged uniformly along the axis of the fibers throughout the cross section of the fibers and at least some of them communicate with each other (see Japanese Laid-Open Patent Publication No. 101,917/1979 and U.S. Pat. No. 4,336,307).

It is an object of this invention therefore to provide a process for producing a porous, film-like or fibrous structure having various excellent properties from an aromatic polyester.

Another object of this invention is to provide a process for producing a porous, film-like or fibrous structure which includes a step of melt-shaping an aromatic polyester while minimizing a decrease in the degree of polymerization of the aromatic polyester and in which, therefore, the deterioration of the properties of the aromatic polyester attributed to the decrease of its degree of polymerization is minimized.

Still another object of this invention is to provide a process for producing a porous, film-like or fibrous structure, which comprises a step of forming numerous micropores by extracting a melt-shaped aromatic polyester in a substantially non-oriented condition.

Yet another object of this invention is to provide a process for producing a porous, film-like or fibrous structure of an aromatic polyester which has various superior properties such as mechanical properties (strength and elongation) and wet heat resistance to a porous, film-like or fibrous structure of an aromatic polyester obtained by a conventional method, and in an especially good case, has a higher porosity, better uniformity of pores or higher air permeability than the latter.

Further objects and advantages of this invention will become apparent from the following description.

According to this invention, these objects and advantages are achieved by a process for producing a porous, film-like or fibrous structure of an aromatic polyester, which comprises (1) forming a substantially non-oriented film-like or fibrous structure by melt-molding an aromatic polyester blend composed of (A) an aromatic polyester containing an aromatic dicarboxylic acid as a main acid component and an aliphatic diol and/or an alicyclic diol as a main glycol component, and (B) at least one low-molecular-weight compound selected from the group consisting of imide compounds and isocyanurate compounds being compatible, but substantially non-reactive, with the aromatic polyester and having a molecular weight of not more than 1,000, the low-molecular-weight compound being present in an amount of 10 to 300 parts by weight per 100 parts by weight of the aromatic polyester, and (2) extracting at least a major part of the low-molecular-weight compound from the resulting substantially non-oriented film-like or fibrous structure with an organic solvent which can dissolve the low-molecular-weight compound but under the extracting conditions does not substantially dissolve the aromatic polyester.

The characteristic feature of the process of this invention is that a substantially non-oriented film-like or fibrous structure is formed from an aromatic polyester by melt-molding and the resulting substantially non-oriented film-like or fibrous structure is extracted with an organic solvent. In other words, the process of this invention excludes a process which comprises stretching a substantially non-oriented film-like or fibrous structure to form an oriented film-like or fibrous structure and then extracting the oriented structure with an organic solvent. The process in which an oriented film-like or fibrous structure prepared from an aromatic polyester composition comprising an aromatic polyester and a low-molecular-weight compound including the low-molecular-weight compounds used in the process of this invention is extracted with an organic solvent is the subject matter of U.S. patent application Ser. No. 340,036 and European patent application No. 82100415.7 filed previously by the same inventors as the present ones.

As is clear from the foregoing description of the prior art, a process in which an unstretched structure of an aromatic polyester obtained by melt-molding is directly extracted with an organic solvent before it is stretched has not been known heretofore to the best of the knowledges of the present inventors.

Investigations of the present inventors have shown that a porous film or fibers having numerous micropores and excellent properties can be obtained by extracting a substantially non-oriented aromatic polyester with an organic solvent and the micropores formed in the substantially non-oriented porous film or fibers are not substantially closed even when the film or fibers are stretched.

The aromatic polyester (A) used in this invention is composed of an aromatic dicarboxylic acid as a main acid component and an aliphatic diol and/or an alicyclic diol as a main glycol component.

Examples of the aromatic dicarboxylic acid include terephthalic acid, isophthalic acid, naphthalenedicarboxylic acid, diphenyldicarboxylic acid, diphenylsulfonedicarboxylic acid, diphenoxyethanedicarboxylic acid, diphenyl ether dicarboxylic acid, methylterephthalic acid and methylisophthalic acid. Examples of the aliphatic diol and/or alicyclic diol include polymethylene glycols having 2 to 10 carbon atoms such as ethylene glycol, trimethylene glycol, tetramethylene glycol, hexamethylene glycol and decamethylene glycol; neopentylene glycol, cyclohexane dimethylol, tricyclodecanedimethylol, 2,2-bis(4-β-hydroxyethoxyphenyl)propane, 4,4'-bis(β-hydroxyethoxy)diphenylsulfone and diethylene glycol; and polyoxyalkylene glycols such as polyoxyethylene glycol, polyoxypropylene glycol, polyoxytrimethylene glycol and polyoxytetramethylene glycol and copolymerized polyoxyalkylene glycols containing two or more of these oxyalkylene units as repeating units. These acid components and glycol components may each be used singly or in a combination of two or more.

Terephthalic acid is preferred as the acid component, and polymethylene glycols having 2 to 6 carbon atoms are preferred as the glycol component.

Thus, examples of the aromatic polyester (A) are polyethylene terephthalate, polytrimethylene terephthalate, polytetramethylene terephthalate, polyethylene 2,6-naphthalenedicarboxylate, poly(ethylene terephthalate/ethylene isophthalate) and poly(ethylene terephthalate/neopentylene terephthalate). Of these, polyethylene terephthalate is preferred.

The aromatic polyesters (A) may have copolymerized or bonded therewith or thereto units derived from a hydroxycarboxylic acid such as p-hydroxybenzoic acid, an aliphatic dicarboxylic acid such as succinic acid, adipic acid and sebacic acid, a polyfunctional compound such as pentaerythritol, trimethylolpropane, trimellitic acid or pyromellitic acid, or a monofunctional compound such as benzoic acid in amounts which maintain the polymer substantially linear.

The aromatic polyester (A) used in this invention has an intrinsic viscosity of preferably at least 0.5, more preferably at least 0.6, and especially preferably at least 0.7. This intrinsic viscosity of the polymer is determined at 35° C. for its solution in a mixture of 60 parts by weight of phenol and 40 parts by weight of tetrachloroethane (E-solution) and is frequently expressed by the symbol $[\eta]$.

The aromatic polyester (A) used in the process of this invention can be produced by a known method such as a melt-polymerization method or a solid-phase polymerization method. In particular, aromatic polyesters having a high degree of polymerization, for example an intrinsic viscosity of at least about 0.8 can be advantageously produced by a solid-phase polymerization method, or a melt-polymerization method using various polymerization promoters [such as diphenyl carbonate (U.S. Pat. No. 3,444,141), diphenyl terephthalate (U.S. Pat. No. 3,433,770), tetraphenyl orthocarbonate (U.S. Pat. No. 3,714,125), bicyclic imino esters (U.S. Pat. No. 4,291,152 and European Laid-Open Patent Application 0019061) and biscyclic imino ethers (U.S. Pat. No. 4,331,800 and European Laid-Open Patent Application 0020944)].

The low-molecular-weight compound used in this invention is an imide or isocyanurate compound which is compatible, but substantially non-reactive, with the aromatic polyester and has a molecular weight of not more than 1,000, preferably not more than 800.

Preferably, the low-molecular-weight compound has a boiling point of at least 200° C., especially at least 250° C., at atmospheric pressure. Low-molecular-weight imide or isocyanurate compounds having a melting point of at least 100° C. are especially preferred in this invention because in admixture with the aromatic polyester, they increase the second order transition point of the aromatic polyester or limit the lowering of its second order transition point to a small extent and therefore, an operation of molding the aforesaid mixture into articles can be carried out easily.

Preferred low-molecular-weight compounds used in the process of this invention are, for example, imide compounds of formula (1)-a below

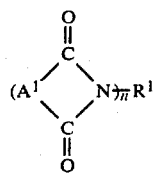

(1)-a wherein $A^1$ represents a divalent aromatic group or a divalent linear or cyclic aliphatic group, each of which may be substituted, $R^1$ represents an aromatic group having a valence of n or a linear or cyclic aliphatic group having a valence of n, each of which may be substituted, and n is 1 or 2, provided that the imide ring in the above formula is 5- or 6-membered;
imide compounds of formula (1)-b below

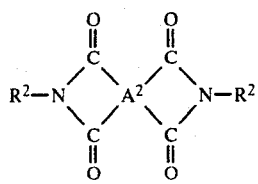

wherein $A^2$ represents a tetravalent aromatic group which may be substituted, and $R^2$ represents a monovalent linear or cyclic aliphatic group which may be substituted, provided that the imide ring in the above formula is 5- or 6-membered; and
trialkyl isocyanurate compounds of formula (1)-c below

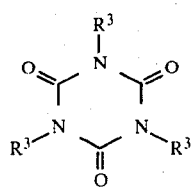

wherein $R^3$ is a monovalent alkyl group.

Compounds of formula (1)-a in which at least one of $A^1$ and $R^1$ is an aromatic group which may be substituted, especially those in which $A^1$ is a divalent aromatic group which may be substituted, are preferred as the compounds of formula (1)-a.

Preferred compounds of formula (1)-b are those in which $R^2$ is a monovalent aliphatic group which may be substituted.

The imide compounds of formula (1)-a and (1)-b are especially preferred as the low-molecular-weight compound (B) used in this invention.

In general formula (1)-a, examples of the divalent aromatic group for $A^1$ are 1,2-phenylene, 1,2-, 2,3- or 1,8-naphthylene, and 5,6,7,8-tetrahydro-1,2- or 2,3-naphthylene groups. Examples of the divalent aliphatic group are linear alkylene groups such as ethylene or trimethylene and cyclic alkylene groups such as 1,2-cyclohexylene, 1,2,3,4-tetrahydro-1,2- or 2,3-naphthylene. These groups may be substituted by substituents which are non-reactive with the aromatic polyesters. Examples of such substituents include lower alkyl groups such as methyl or ethyl, lower alkoxy groups such as methoxy and ethoxy, halogen atoms such as chlorine or bromine, and a cyclohexyl group which may be substituted by nitro, phenyl, phenoxy or methyl.

The aromatic group having a valence of n (n=1 or 2) which is represented by $R^1$ includes, for example, monovalent aromatic groups such as a phenyl group, a naphthyl group, a 5,6,7,8-tetrahydro-1-, 2-, or 3-naphthyl group, or a group of the formula

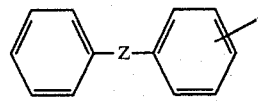

in which Z is —O—, —SO$_2$—, or —CH$_2$—, or divalent aromatic groups such as a 1,2-phenylene group, a 1,2-, 2,3-, or 1,8-naphthylene group, a 5,6,7,8-tetrahydro-1,2-, or 2,3-naphthylene group, or a group of the formula

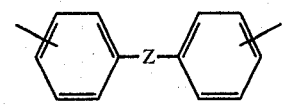

in which Z is —O—, —SO$_2$—, or —CH$_2$. Examples of the aliphatic group having a valence of n (n=1 or 2) include linear alkyl groups having 1 to 18 carbon atoms such as methyl, ethyl, butyl, hexyl, heptyl, octyl, nonyl, decyl, dodecyl, myristyl or stearyl, 5- or 6-membered cyclic alkyl groups such as cyclohexyl or cyclopentyl, linear alkylene groups having 2 to 12 carbon atoms such as ethylene, trimethylene, tetramethylene, hexamethylene, octamethylene, decamethylene or dodecamethylene, and a group of the formula

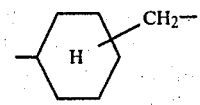

These groups represented by $R^1$ may have the same substituents as exemplified above with regard to $A^1$.

Preferred examples of the tetravalent aromatic group represented by $A^2$ in formula (1)-b are mononuclear, fused ring or polynuclear tetravalent aromatic groups represented, for example by the following formulae

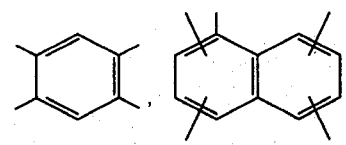

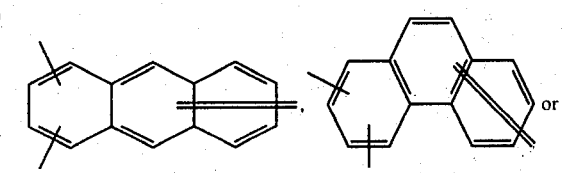

(Z is as defined above).

The same linear alkyl groups having 1 to 18 carbon atoms or 5- or 6-membered cyclic alkyl groups as exemplified with regard to $R^1$ in formula (1)-a may be cited as examples of the monovalent linear or cyclic aliphatic group for $R^2$.

The groups exemplified for $A^2$ and $R^2$ may be substituted by the same substituents as described above with regard to $A^1$.

Examples of the monovalent alkyl group for $R^3$ in formula (1)-c are linear alkyl groups having 1 to 10 carbon atoms, such as methyl, ethyl, propyl, butyl, hexyl, octyl and decyl.

Thus, examples of the imide compounds of formula (1)-a include those in which n is 1, such as N-methylphthalimide, N-ethylphthalimide, N-octylphthalimide, N-laurylphthalimide, N-myristylphthalimide, N-cetylphthalimide, N-stearylphthalimide, N-ethyl-1,8-naphthalimide, N-lauryl-1,8-naphthalimide, N-myrystyl-1,8-naphthalimide, N-cetyl-1,8-naphthalimide, and N-stearyl-1,8-naphthalimide; and those in which n is 2, such as N,N'-ethylenebisphthalimide, N,N'-tetramethylenebisphthalimide, N,N'-hexamethylenebisphthalimide, N,N'-octamethylenebisphthalimide, N,N'-decamethylenebisphthalimide, N,N'-dodecamethylenebisphthalimide, N,N'-neopentylenebisphthalimide, N,N'-tetramethylenebis(1,8-naphthalimide), N,N'-hexamethylenebis(1,8-naphthalimide), N,N'-octamethylenebis(1,8-naphthalimide), N,N'-dodecamethylenebis(1,8-naphthalimide), N,N'-dodecamethylenebissuccinimide, N,N'-dodecamethylenebishexahydrophthalimide, N,N'-1,4-cyclohexylenebisphthalimide, 1-phthalimide-3-phthalimidomethyl-3,5,5-trimethylcyclohexane, N,N'-2,2,4-trimethylhexamethylenebisphthalimide, N,N'-2,4,4-trimethylhexamethylenebisphthalimide, 4,4'-bisphthalimidodiphenylether, 3,4'-bisphthalimidodiphenylether, 3,4'-bisphthalimidodiphenylsulfone, 4,4'-bisphthalimidodiphenylsulfone, and 4,4'-bisphthalimidodiphenylmethane.

Examples of the imide compounds of formula (1)-b include N,N'-diethylpyromellitimide, N,N'-dibutylpyromellitimide, N,N'-dihexylpyromellitimide, N,N'-dioctylpyromellitimide, N,N'-didecylpyromellitimide, N,N'-dilaurylpyromellitimide, N,N'-dicyclohexylpyromellitimide, and N,N'-diethyl-1,4,5,8-naphthalenetetracarboxylic acid 1,8-, or 4,5-diimide.

The imide compound of formula (1)-a can be produced by a known method from the corresponding acid anhydride and an organic amine.

Some of the imide compounds of formula (1)-a are known as dyeability improvers for modified polyesters (see Japanese Patent Publication No. 9677/1969), or a crystallization accelerator for polyethylene terephthalate injection-molding materials (see Japanese Laid-Open Patent Publication No. 84747/1981 and European Patent Application Publication No. 0029930).

Examples of the compounds of formula (1)-c are triethyl isocyanurate, tributyl isocyanurate, trihexyl isocyanurate and trioctyl isocyanurate.

The low-molecular-weight compounds expressed by formulae (1)-a, (1)-b and (1)-c generally have compatibility with the aromatic polyester in the molten state, and even when the molten mixture is cooled and solidified, they do not substantially separate from the aromatic polyester. The compatibility of the low-molecular-weight compound with the aromatic polyester can be judged, for example, by the transparency of the molten mixture or an amorphous solidified sample obtained from it, or the X-ray diffraction pattern, or differential thermal analysis thermogram of the solidified mixture (when a peak based on the low-molecular-weight compound is not substantially observed in the X-ray diffraction pattern or the DTA thermogram, it is judged that the low-molecular-weight compound has excellent compatibility with the aromatic polyester).

According to the process of this invention, a substantially non-oriented film-like or fibrous structure is formed by melt-shaping from a blend composed of the aromatic polyester (A) and the low-molecular-weight compound (B). The blend comprises 100 parts by weight of the aromatic polyester and 10 to 300 parts by weight, preferably 15 to 250 parts by weight, more preferably 20 to 200 parts by weight, of the low-molecular-weight compound (B).

The aromatic polyester blend can be produced by melt-mixing the aromatic polyester (A) with the low-molecular-weight compound (B) in predetermined proportions (a first method); or by performing polycondensation reaction in the presence of the low-molecular-weight compound (B) to obtain a molten mass containing the aromatic polyester (A) and the low-molecular-weight compound (B) in predetermined proportions (a second method); or by reacting in the molten state the aromatic polyester with a polymerization promoter (chain-extender) capable of reacting with the terminal groups of the aromatic polyester under atmospheric or elevated pressure, in the presence of the low-molecular-weight compound (B) to obtain a molten mass containing the aromatic polyester (A) and the low-molecular-weight compound (B) in predetermined proportions (a third method).

According to the first method, the aromatic polyester (preferably dried fully) and the low-molecular-weight compound in predetermined proportions are preferably dry-blended before they are melt-blended in a melt extruder. If the amount of the low-molecular-weight compound is relatively large (for example, if it is used in an amount of more than about 50 parts by weight per 100 parts by weight of the aromatic polyester), a procedure is recommended which comprises subjecting the dry blend to a temperature at which the low-molecular-weight compound melts but the aromatic polyester does not, cooling the mixture, pulverizing the mixture, and then feeding the pulverized mixture into a melt extruder where it is melted.

It can be understood that the second method can be practiced easily when the low-molecular-weight compound used in the process of this invention is substantially non-reactive with the aromatic polyester and has a relatively high boiling point (at least about 200° C. under atmospheric pressure). Accordingly, in the second method, the low-molecular-weight compound can be added to the polymerization system at any time during the polycondensation reaction. If, however, a low-molecular-weight compound (B) having a relatively low boiling point is used, it is liable to be removed out of the polymerization system. Hence, in employing the second method, the use of a low-molecular-weight compound (B) having a molecular weight of at least 440 is recommended.

According to the second method, since the low-molecular-weight compound gives a polymerization system having a lower melt viscosity than that of a polymerization system without the low-molecular-weight compound, the glycol, etc. formed as a result of the polycondensation reaction can be easily removed from the reaction system and consequently, an aromatic polyester having a high degree of polymerization can be easily produced at a relative low temperature. This can be understood from the fact that the low-molecular-weight compounds used in the process of this invention constitute part of the low-molecular-weight compounds used in the invention disclosed in U.S. patent application Ser. No. 340,036 and European Patent Application Publication No. 0057387 (in this invention, the low-molecular-weight compounds are used as a melt viscosity lowering agent). Thus, according to the second method, the resulting aromatic polyester contains a predetermined amount of the low-molecular-weight compound, and it can be directly used as the aromatic polyester blend in the process of this invention.

According to the third method, an aromatic polyester, for example an aromatic polyester having a relatively low molecular weight which can be relatively easily produced by a melt polymerization technique, a chain extender and the low-molecular-weight compound are passed through a melt extruder. During their passage, the aromatic polyester having a relatively low molecular weight is converted to an aromatic polyester having a high molecular weight in the melt extruder and an aromatic polyester blend composed of the high-molecular-weight aromatic polyester and the low-molecular-weight compound (B) which can be used in this invention is obtained.

A suitable means for converting the aromatic polyester having a relatively low molecular weight to the aromatic polyester having a high molecular weight in the aforesaid third method is disclosed, for example, in the specifications of the U.S. Pat. No. 4,331,800 and European Laid-Open Patent Application No. 0020944 filed by the present inventors. According to this means, a carboxyl-terminated aromatic polyester having a relatively low molecular weight is reacted with a biscyclic imino ether compound. Another suitable means is to react a hydroxyl-terminated aromatic polyester having a relatively low molecular weight is reacted with a biscyclic imino ester compound as disclosed in the specifications of U.S. Pat. No. 4,291,152 and European Laid-Open Patent Application No. 0019061 filed by the present inventors.

The third method can be practiced by practicing the methods disclosed in these earlier applications in the presence of the low-molecular-weight compound (B). Accordingly, the disclosures of the aforesaid earlier applications and patent are cited herein as references.

The third method also has the advantage that an aromatic polyester having a high degree of polymerization can be easily produced at relatively low temperatures, as stated with regard to the second method. It also gives the aromatic polyester blend used in this invention which contains the low-molecular-weight compound.

According to the process of this invention, the aromatic polyester blend prepared as above is first melt-shaped to convert it to a substantially non-oriented film-like or fibrous structure. The melt-shaping can be carried out by using an apparatus known in the art under conditions well known in the art. As already stated in detail hereinabove, according to the process of this invention, the melt-shaping can be carried out at temperatures lower than those temperatures which are known for the molding of polymers having the same molecular weights as the aromatic polyesters used in the process of this invention. Examples given hereinafter will clearly show that because of this advantage, the melt shaping of the aromatic polyester blend becomes easy.

The aromatic polyesters used in this invention which, for example, include polyethylene terephthalate having an intrinsic viscosity of 1.0 can be easily molded into a film-like or fibrous structure by the process of this invention at a temperature of about 270° C. to 290° C., although this temperature differs depending upon the type and amount of the low-molecular-weight compound (B) used.

Furthermore, as can be understood from the description of the methods for the production of the aromatic polyester blend described above, the molten aromatic polyester blend to be submitted to the melt-shaping in the process of this invention can be the molten product itself obtained in each of the first to third methods described above. For example, this means that there exists a melt-shaping slit or nozzle connected to the melt extruder used in the first or third method or to the polymerization reactor used in the second method.

According to this invention, the resulting substantially non-oriented film-like or fibrous structure is then extracted with an organic solvent while it remains substantially non-oriented.

The "substantially non-oriented condition" may be defined as a condition wherein a film-like or fibrous structure has a $\Delta n$ value of the following formula $$\Delta n \leq n \times 0.1$$

wherein n is the refractive index of the film-like or fibrous structure in the completely non-oriented state, which is, for example, about 1.575 for polyethylene terephthalate, and $\Delta n$ is a value obtained by subtracting the refractive index ($n_z$) of the film in a direction at right angles to the film plane from whichever larger of the refractive indices ($n_x$, $n_y$) of the film in two perpendicularly crossing directions within the film plane, and is a birefringence for fibers.

The substantially non-oriented film-like or fibrous structure in this invention preferably has $\Delta n \leq n \times 0.09$, especially preferably $\Delta n \leq n \times 0.08$, above all $\Delta n \leq n \times 0.07$.

From another aspect, a substantially non-oriented condition is generally obtained with a non-stretched film-like or fibrous structure. However, as can be easily understood by any one skilled in the art, some unstretched film-like or fibrous structure, when obtained by melt shaping under a very high draft, is not in a substantially non-oriented condition, and some unstretched film-like or fibrous structure obtained by melt shaping remains substantially non-oriented even when subsequently stretched at a low stretch ratio. It will be understood therefore that a substantially non-oriented film-like or fibrous structure can be said to be a non-stretched structure in view of the aforesaid fact, or a structure stretched at a low stretch ratio, for example less than 3 (the stretch ratio denotes an area ratio in the case of a film-like structure).

What is important in the present invention is that extraction with the organic solvent is carried out on the substantially non-oriented film-like or fibrous structure, and is not on an oriented film-like or fibrous structure subjected to stretching in an ordinary sense which is performed to orient the polymer chains.

Although no clear reason can be assigned, the present inventors have not obtained a film-like or fibrous structure having numerous micropores and the desired properties contemplated in the present invention by extracting an oriented film-like or fibrous structure with an organic solvent.

According to the present invention, the extraction is carried out on a film-like structure having a thickness of not more than about 1 mm, preferably about 1 micron to about 500 microns, or a hollow fibrous structure having a diameter of not more than about 1 mm, preferably about 3 to about 400 microns, or a hollow fibrous structure having a thickness of not more than 0.5 mm, preferably 0.05 to 0.5 mm, especially preferably 0.15 to 0.2 mm. Preferably, the hollow fibrous structures have an inside diameter of 0.05 to 2 mm. The film-like or fibrous structure to be subjected to extraction may be crystalline or amorphous if it is substantially non-oriented. Preferably, an amorphous, film-like or fibrous structure is subjected to extraction because it is easy to convert to a porous, film-like or fibrous structure having a high porosity.

The extraction is carried out by using an organic solvent which can dissolve the low-molecular-weight compound (B) used but does not substantially dissolve the aromatic polyester under the extracting conditions, preferably an organic solvent which in addition to meeting the above requirement, is liquid at ambient temperature and has a boiling point of less than about 200° C. under atmospheric pressure.

The organic solvent preferably includes aromatic hydrocarbons having 6 to 9 carbon atoms, halogenated hydrocarbons having 1 or 2 carbon atoms, aliphatic ketones having 3 to 6 carbon atoms, aliphatic esters having 3 to 6 carbon atoms, 5- or 6-membered cyclic ethers, and aliphatic alcohols having 1 to 3 carbon atoms.

Specific examples of the organic solvent include aromatic hydrocarbons having 6 to 9 carbon atoms such as benzene, toluene, ethylbenzene, xylene, cumene and pseudocumene; halogenated aliphatic hydrocarbons having 1 or 2 carbon atoms such as methylene chloride, chloroform, and dichloroethane; aliphatic ketones having 3 to 6 carbon atoms such as acetone, methyl ethyl ketone and methyl isobutyl ketone; aliphatic esters having 3 to 6 carbon atoms such as methyl acetate, ethyl acetate, propyl acetate, methyl propionate, ethyl propionate and propyl propionate; 5- or 6-membered cyclic ethers such as tetrahydrofuran and dioxane; and aliphatic alcohols having 1 to 3 carbon atoms such as methanol, ethanol and propanol.

Of these, aromatic hydrocarbons having 6 to 9 carbon atoms, halogenated hydrocarbons having 1 or 2 carbon atoms, and 5- or 6-membered cyclic ethers are especially preferred.

Preferably, the extraction is carried out under tension, and can be carried out at a temperature between ambient temperature and the boiling point of the organic solvent used. The optimal extracting time required for the extraction varies depending upon the organic solvent used, the thickness of the film-like structure to be submitted to the extraction, the diameter of the fibrous structure to be submitted to the extraction, the amount of the low-molecular-weight compound contained in the film-like or fibrous structure, the extracting temperature, etc. Generally, the optimal time required for the extraction becomes shorter as the thickness of the film-like structure becomes smaller, the diameter of the fibrous structure becomes smaller, and the extracting temperature becomes higher.

In most cases, the extraction can be terminated in several seconds to about 1 hour. Thus, there can be obtained a film-like structure or fibrous structure from which at least about 90% by weight, preferably at least about 95% by weight, above all at least about 98% by weight, of the low-molecular-weight compound contained in it has been extracted out.

The extraction can be carried out by passing the running film-like or fibrous structure through the organic solvent, or by dipping the stationary film-like or fibrous structure in the organic solvent. In either case, the organic solvent may be flowing or stationary. Desirably, at least one of the film-like or fibrous structure and the organic solvent is running or flowing. The amount of the organic solvent used for the extraction should of course be sufficient to dissolve all of the low-molecular-weight compound to be extracted. Usually, it is at least about 10 times, preferably at least about 15 times, the weight of the film-like or fibrous structure.

When a solvent having a relatively high affinity for aromatic polyesters (to be referred to as an affinitive solvent), such as toluene, xylene, dioxane or chloroform, is used as the organic solvent, the affinitive solvent is preferably replaced by a solvent having a relatively low affinity for aromatic polyesters (to be referred to as a non-affinitive solvent) such as methanol, ethanol or hexane following the extraction treatment with the affinitive solvent. This can be effected by dipping the film-like or fibrous structure after the extraction treatment in the non-affinitive solvent. By so doing, the resulting micropores can be stabilized or the porosity of the porous structure can be increased. This also serves to stabilize the manufacturing process, especially the manufacturing process for film-like structures.

Stretching can be carried out monoaxially (in the case of the fibrous or film-like structure) or simultaneously or successively in two axial directions (in the case of the film-like structure).

Let the heat distortion temperature of the aromatic polyester used be $T_g$(°C.) and its melting point be $T_m$(°C.), then the stretching temperature (T, °C.) for the monoaxial stretching or simultaneous or successive biaxial stretching is given preferably by the following expression.

$$T_g \leq T \leq T_m - 10$$

more preferably $$T_g + 30 \leq T \leq T_m - 20$$

especially preferably $$T_g + 50 \leq T \leq T_m - 30$$

The stretch ratio is usually about 1.5 to about 7, preferably about 2 to about 5, in the case of the fibrous structure, and usually about 1.5 to about 30, preferably about 2 to about 20 in the case of the film-like structure in terms of an area ratio.

Since the porous film-like or fibrous structure to be stretched has already undergone extraction, its crystallization has advanced. Thus, it must be stretched at relatively high temperatures as described above.

Stretching can improve the mechanical properties of the porous, film-like or fibrous structure, and also increase the diameters of the pores.

Heat-treatment is preferably carried out under tension. Preferably, the heat-treatment temperature ($T_s$, °C.) for the monoaxially or biaxially stretched structure is given by the following expression.

$$T + 5 \leq T_s \leq T_m - 10$$

The heat-treatment temperature ($T_s$, °C.) for the unstretched structure is preferably given by the equation $T_g + 50 \leq T_s \leq T_m - 10$.

Heat-treatment can be carried out usually for 1 second to 10 minutes.

According to this invention, the porous, film-like or fibrous structure can be treated, as required, with an alkaline solution after the extraction and before or after stretching and/or heat-treatment.

Useful as the alkaline solution is, for example, a solution of an inorganic alkaline compound such as sodium hydroxide, potassium hydroxide, lithium hydroxide or sodium carbonate or an organic amine compound such as ethylamine, propylamine or hydrazine in water or an organic solvent capable of dissolving the aforesaid basic compounds, such as methanol or ethanol. An aqueous solution of the inorganic alkaline compound is preferably used in view of its ease of handling.

There is no particular restriction on the concentration of the alkaline solution. In the case of an aqueous solution of the inorganic alkaline compound for example, the concentration is preferably 0.5 to 40% by weight, especially preferably 1 to 30% by weight.

The treating temperature differs depending upon the concentration of the alkaline solution, but in the case of the aqueous solution of the inorganic alkaline compound, it is usually from room temperature to about 80° C. Furthermore, the treating time may be properly determined so that the desired pore diameter and porosity can be obtained. It is usually about 30 seconds to about 30 minutes. Preferably, the molded structure is maintained at constant length or under tension during the treatment with the alkaline solution.

By the alkaline solution treatment described above, the fine pores formed by the extraction treatment are enlarged, and a porous, film-like or fibrous structure having the desired pore diameter and porosity can be easily obtained.

Thus, according to this invention, a porous, film-like or fibrous structure (e.g., hollow fibrous structure) of aromatic polyester substantially free from the low-molecular-weight compound can be produced.

The porous, film-like or fibrous structure obtained by the process of this invention has a very low oligomer content.

According to this invention, there can be advantageously produced a porous, film-like or fibrous structure of aromatic polyester containing numerous micropores having an average pore diameter of not more than 1 micron and having a porosity of 20 to 85% and an air-permeation speed at 20° C. of $1 \times 10^{-8}$ to 10 $cm^3/cm^2 \cdot sec \cdot cmHg$.

The porous, film-like or fibrous structure obtained by the process of the invention described hereinabove has the inherent excellent heat resistance and chemical resistance of the polyester, and is very useful as a filtration membrane for liquid osmosis, fine filtration, ultrafiltration and reverse osmosis, or as a porous support for reverse osmosis membranes, etc. It can also be used as a functional material having a lubricant, a surface active agent, an insect controlling agent, a fungicide, a fire retardant, an antioxidant, a deodorizer, a perfume, etc., each of which is preferably liquid, included in its microporous portions, or as a waterproof material having air permeability or moisture permeability.

The following examples further illustrate the process of this invention.

In these examples, all parts are by weight, and the various properties in these examples were measured by the following methods.

(1) Intrinsic viscosity ($[\eta]$)

Measured in E-solution at 35° C. in a concentration of 1.2 g/dl.

(2) Thickness of the film

Measured by using an electronic micrometer (Model K-351 made by Anritsu Co.).

(3) Porosity and average pore diameter

Measured by a porosimeter (Model 60000 PSI, made by American Instrument Company) in accordance with the mercury intrusion method.

(4) Maximum pore diameter

The maximum pore diameter is measured by a bubble point method (ASTM F316).

(5) Air-permeation speed

When the speed of air permeation is large, it is measured by using an ordinary flow meter. When the air-permeation speed is below about $10^{-4}$ $cm^3/cm^2 \cdot sec \cdot cmHg$, it is measured by a pressure method [see pages 210–218 of a Japanese-language publication "Handbook of Materials and Water Content—Moisture Absorption, Moisture Prevention, Moisture Control, Drying . . . " edited by the Society of Polymer, published by Kyoritsu Shuppan Kabushiki Kaisha on Apr. 15, 1968].

(6) Air-Permeability (seconds/100 cc)

Measured in accordance with JIS P8117.

(7) Liquid flux ($ml/m^2 \cdot hr \cdot mmHg$)

Determined from the amount of pure water permeated at 25° C. and 1 $kg/cm^2 \cdot G$.

(8) Solute rejection (%)

The amount of the solute is measured by using a total organic carbon analyzer (TOC-10B, made by Shimadzu Seisakusho Co., Ltd.). The solute rejection is determined by the following equation.

$$\text{Solute rejection} = \left\{ 1 - \frac{\text{Concentration of the solute in the permeated solution}}{\text{Concentration of the solute in the feed solution}} \right\} \times 100$$

EXAMPLES 1 TO 6

One hundred parts of polyethylene terephthalate having an intrinsic viscosity of 1.03 was dry-blended with a predetermined amount of each of the low-molecular-weight compounds shown in Table 1. The resulting blend was melt-extruded by an extruder at a temperature of about 270° C. with an average resistance time of about 6 minutes. The extrudate was rapidly cooled to form a transparent, substantially non-oriented, amorphous film having a thickness of about 80 microns.

The film was then dipped for about 10 minutes in each of the organic solvents shown in Table 1 under circulation while it was maintained at constant length. The low-molecular-weight compound was thus extracted from the film. The treated film was then dipped in ethanol at room temperature to exchange the solvent, and dried at 150° C. for 15 minutes. The thickness, average pore diameter and porosity of the resulting porous polyethylene terephthalate film are shown in Table 1.

TABLE 1

| Example | Low-molecular-weight compound | (amount in part) | Organic solvent | Porosity (%) | Average pore diameter (microns) | Film thickness (microns) |
|---|---|---|---|---|---|---|
| 1 | 1-Phthalimido-3-phthalimidomethyl-3,5,5-trimethyl-cyclohexane | (100) | Xylene | 58 | 0.040 | 82 |
| 2 | 1-Phthalimido-3-phthalimidomethyl-3,5,5-trimethyl-cyclohexane | (120) | Chloroform | 62 | 0.072 | 78 |
| 3 | N,N′—dodecamethylene bisphthalimide | (50) | Xylene | 26 | 0.018 | 66 |
| 4 | 3,4′-bisphthalimido-diphenyl ether | (120) | Dioxane | 48 | 0.038 | 72 |
| 5 | N,N′—dioctylpyromellitimide | (60) | Xylene | 34 | 0.027 | 68 |
| 6 | N,N′—bis(3,3,5-trimethylcyclohexyl)-pyromellitimide | (100) | Xylene | 59 | 0.045 | 80 |

EXAMPLES 7 TO 10

One hundred parts of polyethylene terephthalate chips having an intrinsic viscosity of 0.98 were dry-blended with 110 parts of 1-phthalimido-3-phthalimidomethyl-3,5,5-trimethylcyclohexane, and as chain extenders, 0.3 part of 2,2′-bis(2-oxazoline) and 0.5 part of 2,2′-bis(3,1-benzoxazin-4-one). The blend was melt-extruded by an extruder at a temperature of about 270° C. with an average resistance time of about 7 minutes. The extrudate was rapidly cooled to form a transparent, substantially non-oriented, amorphous film having a thickness of about 60 microns.

The film was maintained at constant length and dipped for 15 minutes in each of the organic solvents indicated in Table 2 under circulation, then dipped in ethanol at room temperature, and dried at 150° C. for about 15 minutes.

The maximum pore diameter, pure water flux and air-permeability of the resulting film are shown in Table 2.

TABLE 2

| Example | Organic solvent | Maximum pore diameter (microns) | Pure water flux (liter/ m² · hr · atm.) | Air-permeability (seconds/ 100 cc) |
|---|---|---|---|---|
| 7 | Acetone | 0.15 | 7.9 | 1657 |
| 8 | Methyl ethyl ketone | 0.13 | 42.1 | 626 |
| 9 | Dioxane | 0.15 | 22.1 | 1621 |
| 10 | Chloroform | 0.19 | 284.1 | 478 |

EXAMPLE 11

The porous film obtained in Example 1 was stretched simultaneously both in the longitudinal and transverse directions at 130° C. The resulting film had a thickness of 58 microns and an air-permeability of 560 (seconds/100 cc). The film obtained in Example 1 had an air-permeability of 3780 (seconds/100 cc).

EXAMPLE 12

One hundred parts of polytetramethylene terephthalate chips having an intrinsic viscosity of 1.18 were dry-blended with 100 parts of 1-phthalimido-3-phthalimidomethyl-3,5,5-trimethylcyclohexane, and the blend was melt-extruded by an extruder at a temperature of 235° C. with an average residence time of about 5 minutes. The extrudate was rapidly cooled to obtain a transparent, substantially non-oriented film having a thickness of about 90 microns.

The film, maintained at constant length, was dipped in circulating toluene for about 8 minutes, followed by drying at 130° C. for 15 minutes. The resulting film had a porosity of 41% and an average pore diameter of 0.063 microns.

EXAMPLES 13 TO 18

One hundred parts of polyethylene terephthalate having an intrinsic viscosity of 1.03 was dry-blended with a predetermined amount of each of the low-molecular-weight compounds indicated in Table 3. The mixture was melt-extruded through a T-die in an extruder at a temperature of 270° C. with an average residence time of about 6 minutes. The extrudate was rapidly cooled to obtain a transparent, substantially non-oriented, amorphous film having a thickness of about 80 microns. The film, maintained at constant length, was then dipped for about 10 minutes in each of the organic solvents indicated in Table 3 under circulation for about 10 minutes to extract the low-molecular-weight compound from the film, then dipped in ethanol at room temperature to exchange the solvent, and dried at 150° C. for 15 minutes. The resulting film was dipped in a 5% aqueous solution of sodium hydroxide at 40° C. for each of the times indicated in Table 3, washed with water, and dried.

The porosity and average pore diameter of the resulting film are shown in Table 3.

TABLE 3

| Example | Low-molecular-weight compound Kind | Amount (parts) | Organic solvent | Treatment with the alkali for | | | |
|---|---|---|---|---|---|---|---|
| | | | | 10 minutes | | 25 minutes | |
| | | | | Porosity (%) | Average pore diameter (microns) | Porosity (%) | Average pore diameter (microns) |
| 13 | 1-Phthalimido-3-phthalimidomethyl-3,5,5-trimethylcyclohexane | 100 | Methyl ethyl ketone | 64 | 0.057 | 71 | 0.096 |
| 14 | 1-Phthalimido-3-phthalimidomethyl-3,5,5-trimethylcyclohexane | 100 | Xylene | 65 | 0.048 | 71 | 0.061 |
| 15 | 1-Phthalimido-3-phthalimidomethyl-3,5,5-trimethylcyclohexane | 120 | Chloroform | 68 | 0.089 | 74 | 0.110 |
| 16 | N,N'—dodecamethylene-bisphthalimide | 50 | Xylene | 35 | 0.024 | 41 | 0.037 |
| 17 | 3,4'-bisphthalimido-diphenyl ether | 120 | Dioxane | 55 | 0.043 | 62 | 0.060 |
| 18 | N,N'—bis(3,5,5-trimethyl-cyclohexyl)pyromellitimide | 100 | Xylene | 40 | 0.035 | 49 | 0.048 |

EXAMPLES 19 TO 22

One hundred parts of polyethylene terephthalate chips having an intrinsic viscosity of 0.98 was blended with 110 parts of 1-phthalimido-3-phthalimidomethyl-3,5,5-trimethylcyclohexane and as chain extenders, 0.3 part of 2,2'-bis(2-oxazoline) and 0.5 part of 2,2'-bis(3,1-benzoxazin-4-one). The blend was melt-extruded by an extruder at a temperature of about 270° C. with an average residence time of about 7 minutes. The extrudate was rapidly cooled to obtain a transparent, substantially non-oriented, amorphous film having a thickness of about 60 microns.

The film, maintained at constant length, was dipped for about 15 minutes in each of the organic solvents indicated in Table 4 under circulation, then dipped in ethanol at room temperature, and dried at 150° C. for about 15 minutes.

The resulting film was dipped for 5 minutes in a 5% aqueous solution of sodium hydroxide, then well washed with cold water, and dried at 120° C. for 15 minutes.

The air-permeability and maximum pore diameter of the resulting film are shown in Table 4.

TABLE 4

| Example | Organic solvent | Air-permeability (seconds/100 cc) | Maximum pore diameter (microns) |
|---|---|---|---|
| 19 | Acetone | 743 | 0.26 |
| 20 | Methyl ethyl ketone | 392 | 0.25 |
| 21 | Dioxane | 716 | 0.32 |
| 22 | Chloroform | 280 | 0.38 |

EXAMPLE 23

The porous film obtained in Example 20 was stretched simultaneously in the longitudinal and transverse directions each at a stretch ratio of 1.4 at 150° C. The stretched film had an air-permeability of 206 seconds/100 cc and a maximum pore diameter of 0.48 micron.

EXAMPLE 24

The film obtained in Example 13 was stretched simultaneously in the longitudinal and transverse directions each at a stretch ratio of 1.5 at 160° C. The stretched film was dipped for 30 minutes in a 5% aqueous solution of sodium hydroxide at 40° C., washed with water, and dried. The resulting film had a porosity of 75% and an average pore diameter of 0.192 micron.

EXAMPLE 25

One hundred parts of polytetramethylene terephthalate chips having an intrinsic viscosity of 1.18 were dry-blended with 100 parts of 1-phthalimido-3-phthalimidomethyl-3,5,5-trimethylcyclohexane. The blend was melt-extruded at a temperature of 235° C. with an average residence time of about 5 minutes. The extrudate was rapidly cooled to form a transparent, substantially non-oriented film having a thickness of about 90 microns.

The film, maintained at constant length, was dipped for about 8 minutes in circulating toluene, and dried at 130° C. for about 15 minutes.

The resulting film was dipped for 20 minutes in a 10% aqueous solution of sodium hydroxide at 35° C. The film had a porosity of 52% and an average pore diameter of 0.081 micron.

EXAMPLES 26 TO 29

One hundred parts of polyethylene terephthalate having an intrinsic viscosity of 1.03 was dry-blended with a predetermined amount of each of the low-molecular-weight compounds shown in Table 5. The blend was melt-extruded at about 280° C. by using a twin-screw extruder equipped with a cylindrical spinneret having an inside diameter of 1.6 mm and an outside diameter of 2.0 mm while passing nitrogen gas through the cylinder, cooled at a point about 10 cm below the spinneret, and wound up to obtain a substantially non-oriented hollow yarn.

The hollow yarn, maintained at constant length, was dipped for 10 minutes in each of the solvents shown in Table 5 under circulation to extract the low-molecular-weight compound, and dried at 150° C. The properties of the resulting hollow yarn are shown in Table 5.

The permselective properties of the resulting hollow yarn were determined by using a 0.1% aqueous solution of gamma-globulins taken from bovine serum. The results are shown in Table 6.

TABLE 5

| Example | Low-molecular-weight compound | (parts) | Organic solvent | Inside diameter (microns) | Thickness (microns) | Porosity (%) | Average pore diameter (microns) |
|---|---|---|---|---|---|---|---|
| 26 | 1-Phthalimido-3-phthalimidomethyl-3,5,5-trimethyl-cyclohexane | (100) | Xylene | 360 | 155 | 60 | 0.045 |
| 27 | 1-Phthalimido-3-phthalimidomethyl-3,5,5-trimethyl-cyclohexane | (120) | Chloroform | 348 | 147 | 64 | 0.080 |
| 28 | N,N'—dodecamethyl-enebisphthalimide | (50) | Xylene | 345 | 140 | 26 | 0.019 |
| 29 | 3,4'-bisphthalimido-diphenyl ether | (120) | Dioxane | 345 | 145 | 45 | 0.041 |

TABLE 6

| Hollow yarn used (Example) | Air-permeation speed (20° C.) (cm³/cm²·sec·cmHg) | Permselective properties Solution | Flux (ml/m²·hr·mmHg) | Rejection (%) |
|---|---|---|---|---|
| 26 | $3 \times 10^{-3}$ | 0.1% aqueous solution of gamma-globulins from bovine serum | 0.02 | 95 |
| 27 | $2.0 \times 10^{-2}$ | 0.1% aqueous solution of gamma-globulins from bovine serum | 31 | 31.0 |
| 28 | $2.8 \times 10^{-3}$ | 0.1% aqueous solution of gamma-globulins from bovine serum | 0.01 | 97 |
| 29 | $1 \times 10^{-2}$ | 0.1% aqueous solution of gamma-globulins from bovine serum | 3.0 | 68 |

EXAMPLE 30

The hollow yarn obtained in Example 27 was dipped in ethanol at room temperature to exchange the solvent, and dried at 150° C. for 15 minutes. The resulting hollow yarn was dipped for 25 minutes in a 5% aqueous solution of sodium hydroxide at 40° C. The treated hollow yarn had a porosity of 75% and an average pore diameter of 0.15 micron, and an air-permeation speed at 20° C. of $5.1 \times 10^{-2}$ cm³/cm²·sec·cmHg.

The permselective properties of the treated hollow yarn were determined by using a 0.1% aqueous solution of gamma-globulins taken from bovine serum. It was found to have a flux of 80 ml/m²·hr·mmHg and a rejection of 21%.

EXAMPLE 31

The hollow yarn obtained in Example 30 was stretched to 1.5 times at 150° C. The stretched yarn had an average pore diameter of 0.25 micron.

EXAMPLE 32

One hundred parts of polytetramethylene terephthalate chips having an intrinsic viscosity of 1.18 were dry-blended with 100 parts of 1-phthalimido-3-phthalimidomethyl-3,5,5-trimethylcyclohexane, and the blend was molded into a hollow yarn by the same method as in Example 26. The resulting substantially non-oriented hollow yarn, maintained at constant length, was dipped for about 8 minutes in circulating toluene to extract the low-molecular-weight compound, and dried at 130° C. The resulting hollow yarn had a porosity of 45% and an average pore diameter of 0.063 micron. Its permselective properties were determined in the same way as in Example 26. It was found to have a flux of 6.1 ml/m²·hr·mmHg and a rejection of 43%.

What is claimed is:

1. A process for producing a porous, film-like or fibrous structure of an aromatic polyester, which comprises
   (1) forming a substantially non-oriented film-like or fibrous structure by melt-molding an aromatic polyester blend composed of
   (A) an aromatic polyester containing an aromatic dicarboxylic acid as a main acid component and an aliphatic diol and/or an alicyclic diol as a main glycol component, and
   (B) at least one low-molecular-weight compound selected from the group consisting of imide compounds and isocyanurate compounds being compatible, but substantially non-reactive, with the aromatic polyester and having a molecular weight of not more than 1,000, the low-molecular-weight compound being present in an amount of 10 to 300 parts by weight per 100 parts by weight of the aromatic polyester, and (2) extracting at least a major part of the low-molecular-weight compound from the resulting substantially non-oriented film-like or fibrous structure with an organic solvent which can dissolve the low-molecular-weight compound but under the extracting conditions does not substantially dissolve the aromatic polyester.

2. The process of claim 1 wherein after the extracting treatment, the film-like or fibrous structure is stretched and/or heat-treated.

3. The process of claim 1 or 2 wherein the aromatic polyester has an intrinsic viscosity, measured at 35° C. in a mixed solution consisting of 60 parts by weight of phenol and 40 parts by weight of tetrachloroethane, of at least about 0.5.

4. The process of claim 1 or 2 wherein the aromatic polyester has an intrinsic viscosity, measured at 35° C. in a mixed solution consisting of 60 parts by weight of phenol and 40 parts by weight of tetrachloroethane, of at least about 0.6.

5. The process of claim 1 wherein the imide compound is a compound represented by the following formula

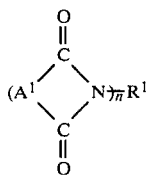

wherein $A^1$ represents a divalent aromatic group or a divalent linear or cyclic aliphatic group, each of which may be substituted, $R^1$ represents an aromatic group having a valence of n or a linear or cyclic aliphatic group having a valence of n, each of which may be substituted, and n is 1 or 2, provided that the imide ring is 5- or 6-membered.

6. The process of claim 5 wherein at least one of $A^1$ and $R^1$ is said aromatic group which may be substituted.

7. The process of claim 1 wherein the imide compound is a compound represented by the following formula

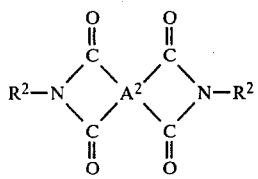

wherein $A^2$ represents a tetravalent aromatic group which may be substituted, and $R^2$ represents a monovalent linear or cyclic aliphatic group which may be substituted, provided that the imide ring in the formula is 5- or 6-membered.

8. The process of claim 7 wherein $R^2$ is a monovalent linear or cyclic aliphatic group.

9. The process of claim 1 wherein the isocyanurate compound is a compound represented by the following formula

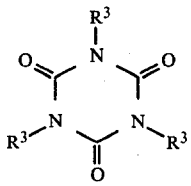

wherein $R^3$ is a monovalent alkyl group.

10. The process of claim 1 wherein the low-molecular-weight compound has a molecular weight of not more than 800.

11. The process of claim 1 wherein the low-molecular-weight compound has a melting point of at least 100° C.

12. The process of claim 1 wherein the low-molecular-weight compound has a boiling point of at least 200° C. at atmospheric pressure.

13. The process of claim 1 wherein the amount of the low-molecular-weight compound is 15 to 250 parts by weight per 100 parts by weight of the aromatic polyester.

14. The process of claim 1 wherein the amount of the low-molecular-weight compound is 20 to 200 parts by weight per 100 parts by weight of the aromatic polyester.

15. The process of claim 1 wherein the film-like structure to be extracted has a thickness of not more than about 1 mm.

16. The process of claim 15 wherein the film-like structure to be extracted has a thickness of about 1 to about 500 microns.

17. The process of claim 1 wherein the fibrous structure to be extracted is a solid fibrous structure having a diameter of not more than about 1 mm or a hollow fibrous structure having a thickness of not more than 0.5 mm.

18. The process of claim 17 wherein the fibrous structure to be extracted is a solid fibrous structure having a diameter of about 3 to about 400 microns, or a hollow fibrous structure having an inside diameter of 0.05 to 2 mm.

19. The process of claim 1 wherein the organic solvent used in the extraction is liquid at ambient temperature and has a boiling point of not more than about 200° C. at atmospheric pressure.

20. The process of claim 1 or 19 wherein the organic solvent is an aromatic hydrocarbon having 6 to 9 carbon atoms, a halogenated aliphatic hydrocarbon having 1 or 2 carbon atoms, an aliphatic ketone or ester having 3 to 6 carbon atoms, a 5- or 6-membered cyclic ether, or an aliphatic alcohol having 1 to 3 carbon atoms.

21. The process of claim 1 wherein the extraction is carried out at a temperature between ambient temperature and the boiling point of the organic solvent used.

22. The process of claim 1 wherein the extraction is carried out while the film-like or fibrous structure is under tension.

23. The process of claim 1 wherein the aromatic polyester contains terephthalic acid as a main acid component and polymethylene glycol having 2 to 6 carbon atoms as a main glycol component.

* * * * *

UNITED STATES PATENT AND TRADEMARK OFFICE
CERTIFICATE OF CORRECTION

PATENT NO. : 4,419,308
DATED : December 6, 1983
INVENTOR(S) : Shunichi Matsumura and Hiroo Inata It is certified that error appears in the above—identified patent and that said Letters Patent is hereby corrected as shown below:

On the title page,

The date of the Foreign Application Priority Data should be April 13, 1982.

Signed and Sealed this

Twenty-first Day of February 1984

[SEAL]

Attest:

GERALD J. MOSSINGHOFF

Attesting Officer     Commissioner of Patents and Trademarks